United States Patent [19]

Davidson

[11] 3,792,653

[45] Feb. 19, 1974

[54] TOASTER

[76] Inventor: Brian Davidson, 34 Pineway Blvd., Willowdale, Ontario, Canada

[22] Filed: Mar. 20, 1972

[21] Appl. No.: 235,927

[52] U.S. Cl. ........................ 99/339, 99/393, 99/427, 99/441, 99/448
[51] Int. Cl. ........................................... A47j 37/08
[58] Field of Search ..... 99/339, 441, 446, 447, 329, 99/385, 393, 400, 401, 427, 448

[56] References Cited
UNITED STATES PATENTS

| | | | |
|---|---|---|---|
| 3,308,748 | 3/1967 | Jalbert | 99/448 X |
| 2,075,474 | 3/1937 | Scutt | 99/385 X |
| 2,561,538 | 7/1951 | Schultz | 99/420 |
| 2,602,392 | 7/1952 | Panken | 99/441 X |
| 1,971,012 | 8/1934 | MacDonald | 99/441 X |
| 1,809,867 | 6/1931 | Rittberger | 99/441 X |
| 1,716,266 | 6/1929 | Flamm | 99/441 X |

Primary Examiner—Billy J. Wilhite
Attorney, Agent, or Firm—Rogers, Bereskin & Parr

[57] ABSTRACT

A toaster for frankfurters and buns, having a circular frankfurter heating chamber formed by two apertured reflective removable shields. The shields have inturned ends forming two spaced cylindrical frankfurter guides. Two arcuate bun heating chambers partly encircle the frankfurter heating chamber, with a frankfurter guide between the arms of each bun heating chamber. A common elevator raises and lowers both frankfurters and buns simultaneously. Part of the heat from an element in the frankfurter heating chamber passes through apertures in the shields to toast buns in the bun heating chambers, and the remainder is reflected back to augment the heat applied to the frankfurters, so the frankfurters and buns will be finished together. Since each bun is toasted in partly opened configuration, it will not split in two, and since it pops-up partly encircling its frankfurter, it can be used to grasp and remove the frankfurter.

9 Claims, 11 Drawing Figures

TOASTER

This invention relates to a toaster for toasting frankfurter buns, and it further relates to a toaster for toasting frankfurters and buns simultaneously.

In the past, toasters for frankfurter buns have required that the bun be opened fully, to a flat configuration. This usually caused the bun to split into two separate pieces, which is undesirable and annoying to the consumer. In addition, in prior art bun toasters, it has been necessary to toast and remove the frankfurter and bun separately, after which the frankfurter is then placed in the bun. Since the frankfurter is hot, a utensil such as a fork must be used to handle it, and the likelihood exists that frankfurters will occasionally be dropped during this operation.

Accordingly, it is an object of the present invention to provide a frankfurter bun toaster in which the buns are toasted in curved or angled slots, so that the buns need not be opened wide in order to toast them. Because the buns need only be partly opened (typically to an included angle of about 90°), the danger that the buns will break into two pieces is substantially eliminated.

In another aspect of the invention, each frankfurter is supported for toasting in a cylindrical guide located generally between the arms of the partly-opened bun. Both the frankfurter and bun are supported by the same elevator mechanism, so that when toasting is completed, both will pop-up together. The portion of the bun projecting from the toaster is then used to grip the portion of the frankfurter projecting from the toaster, and the two are lifted out together. This positions the frankfurter in the bun and allows the user to remove the frankfurter from the toaster without the need for handling the frankfurter separately.

Further objects and advantages of the invention will appear from the following description, taken together with the accompanying drawings, in which.

Figure 1:
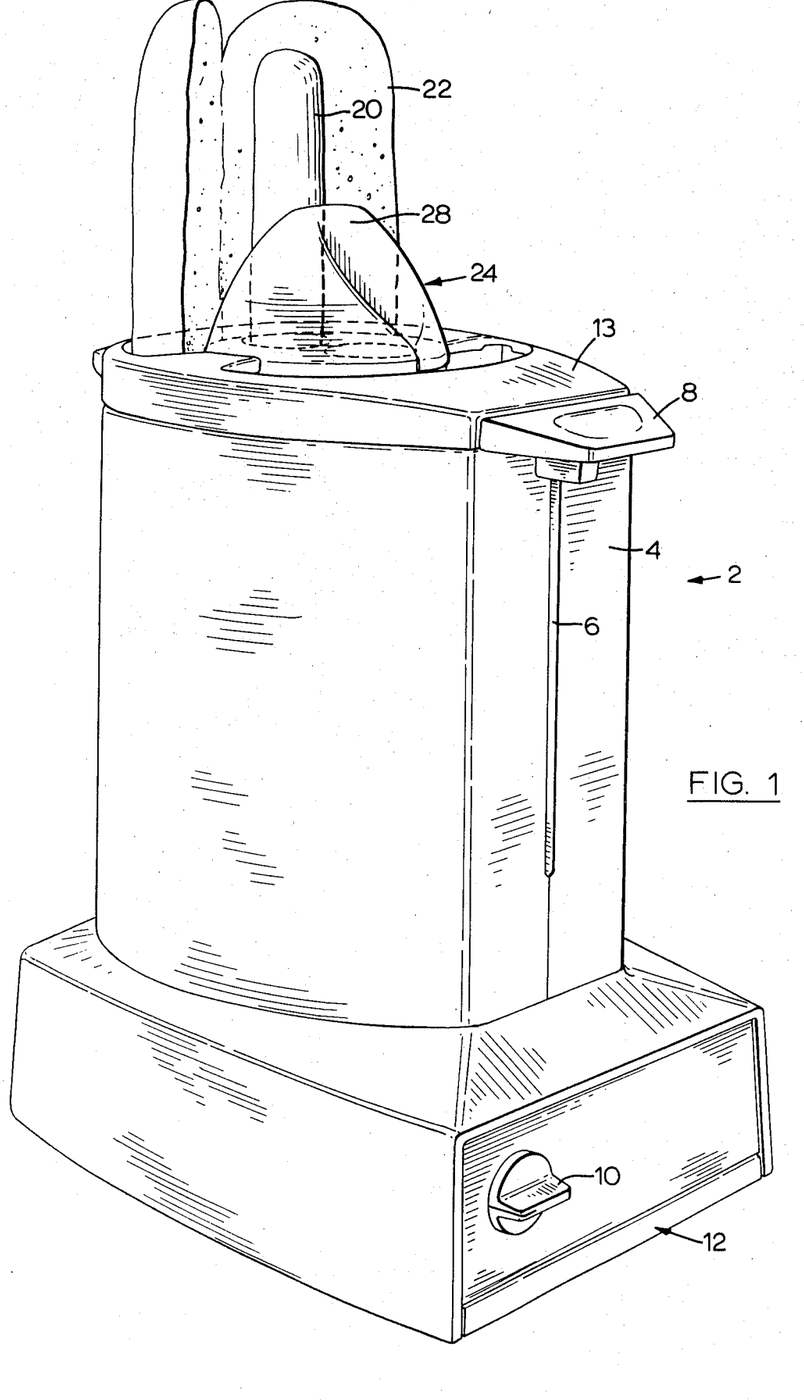
FIG. 1 is a perspective view of a toaster according to the invention.

Reference is first made to FIG. 1, which shows at 2 a preferred form of toaster according to the invention. The toaster 2 includes an exterior body casing 4 having a vertical slot 6 which accommodates the up and down travel of a lift mechanism knob 8. The toaster 2 is also fitted with a timer control knob 10 to control the degree of heating of the frankfurters and buns, and a grease drawer 12 to collect grease from the frankfurters. A top cover 13 protects the electrical connections and the like within the toaster.

Figure 2:
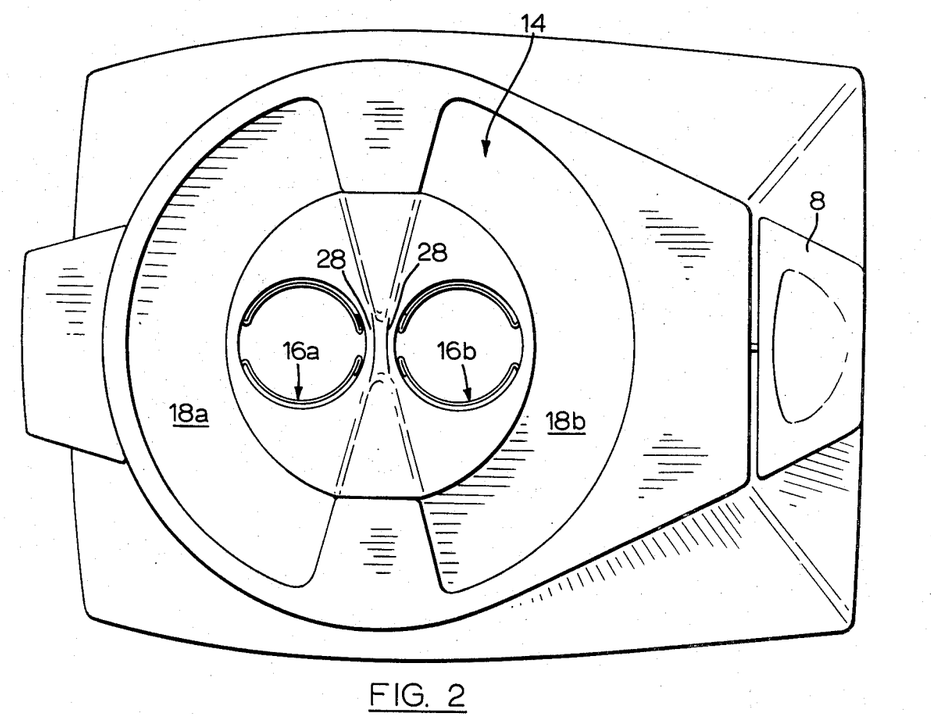
FIG. 2 is a top view of the toaster of FIG. 1.
Figure 3:
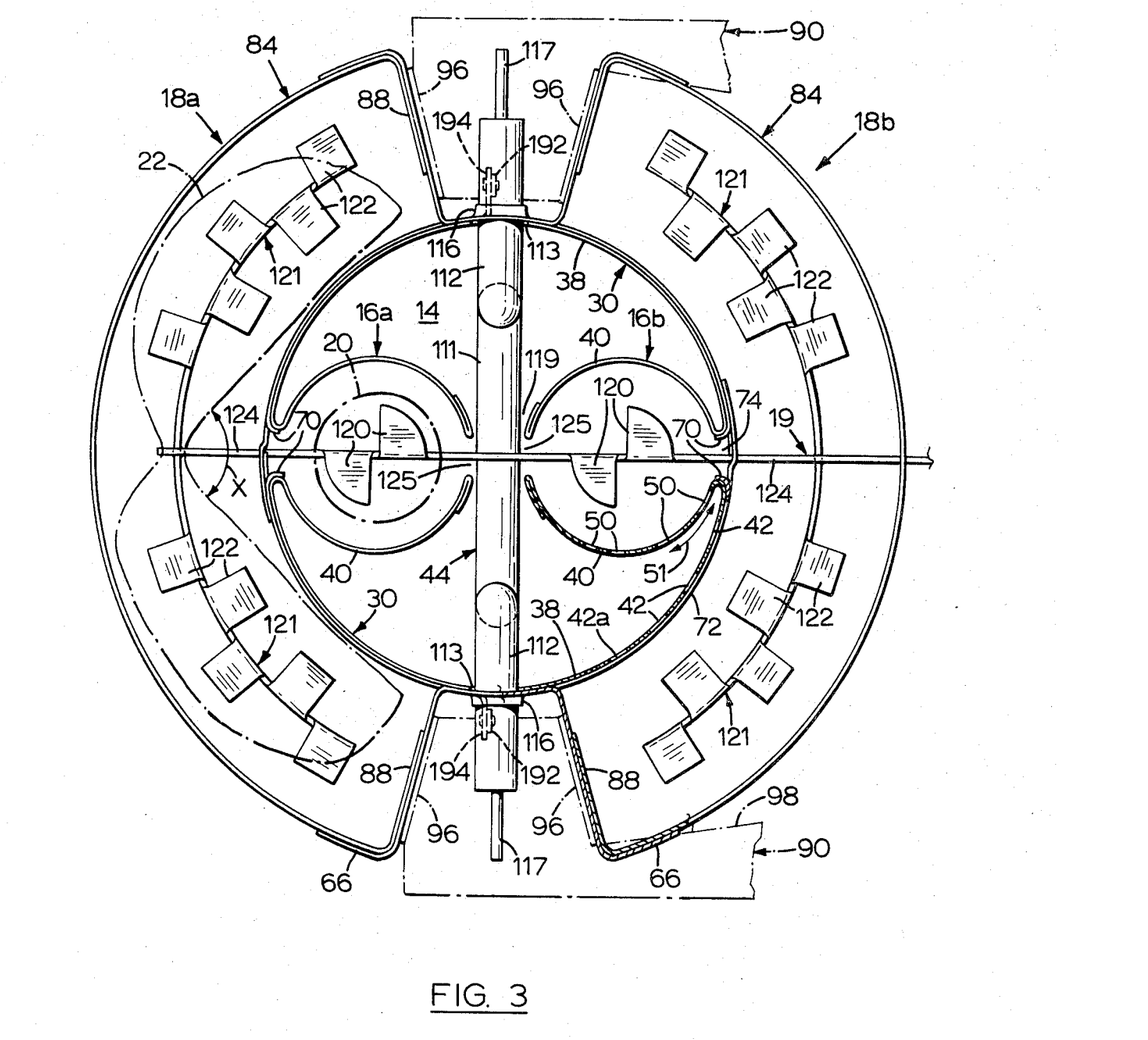
FIG. 3 is a top view of a frame, heating chambers and elevator of the FIG. 1 toaster.

As best shown in FIGS. 2 and 3, the toaster includes a cylindrical frankfurter heating chamber 14 containing a pair of small vertical cylindrical guide structures 16a, 16b, each of which accommodates one frankfurter. Also provided are two arcuate bun heating chambers 18a, 18b, each for one bun and each partly encircling the frankfurter heating chamber 14. A single elevator 19 (FIG. 3) is provided to raise and lower together the two frankfurters and the two buns. The elevator 19 is actuated by the knob 8, as will be described.

In FIGS. 1 and 2 the only parts of the frankfurter heating chamber that are visible are the tops of the cylindrical guide structures 16a, 16b. FIG. 1 also shows one frankfurter 20 and bun 22 in "popped-up" position. It will be seen that the frankfurter 20 is embraced by the bun 22, so that the projecting portion of the bun can be closed on the frankfurter and the frankfurter can then be lifted out of the toaster by means of the bun.

To restrict movement of the frankfurter 20 away from the bun 22 when the frankfurter is being gripped by the bun, a backstop 24 is provided. The backstop 24, which is formed of sheet metal crimped to the top cover 13 of the toaster, has a pair of elongated rear surfaces 28 which limit movement of the frankfurter away from the bun, and the backstop 24 slopes forwardly and downwardly toward the bun to interfere as little as possible with closure of the bun. The backstop 24 is not absolutely essential and can be eliminated, but it provides considerable convenience for users of the device.

Figure 4:
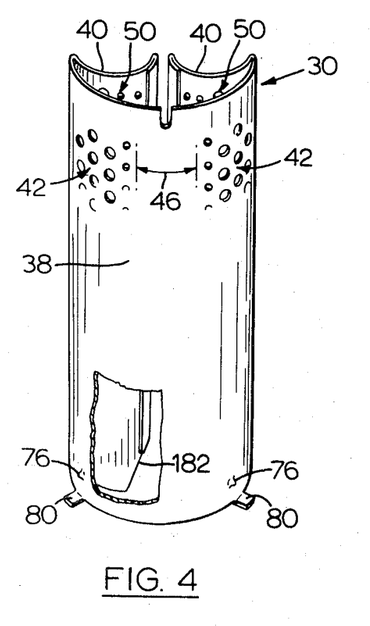
FIG. 4 is a perspective view of a shield of the FIG. 1 toaster.
Figure 5:
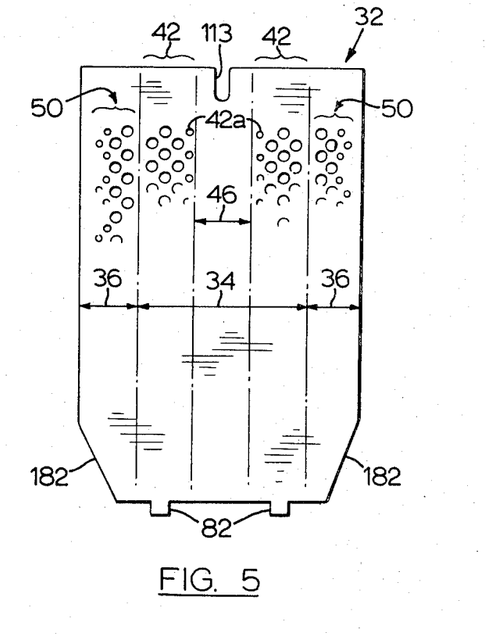
FIG. 5 is a plan view of a blank used to form the FIG. 4 shield.

The details of the construction of the frankfuter heating chamber 14 will next be described, with reference to FIGS. 3 to 5. As indicated in FIG. 3, the frankfurter heating chamber 14 is formed by two shields 30. Each shield 30, shown in perspective in FIG. 4, is made of thin sheet metal, typically stainless steel, bent to shape from a flat blank 32 (FIG. 5). It will be seen that the blank 32, which is generally rectangular in shape, has a central portion 34 and two outer portions 36. The central portion 34 is bent into a curved wall 38 of the shield 30, while each outer portion 36 of the blank is inturned and bent into a semi-cylindrical wall 40 of the shield 30. As shown in FIG. 3, the curved walls 38 of the shields 30 almost completely enclose the frankfurter heating chamber 14, while the inturned semi-cylindrical walls 40 each form one-half of a frankfurter guide structure 16a, 16b.

As shown in FIG. 5, the central portion 34 of the blank 32 contains two sets of holes 42 at its sides. When the blank 32 is bent into shield 30, the holes 42 become located at the sides of curved wall 38 and permit heat from an element 44 (FIGS. 3, 9) in the frankfurter heating chamber to pass through the shield 30 into the bun heating chambers 18a, 18b. The holes 42 are made of the required size and number, relative to the heat provided by the element, to toast buns in the bun heating chambers 18a, 18b while frankfurters are being cooked.

The holes 42 do not extend into the central area 46 of the curved wall 38, because no part of the bun heating chambers 18a, 18b is located behind these areas. In fact, as shown in FIG. 3, there are no holes 42 at the extreme outer ends of the bun heating chambers 18a, 18b. This ensures that the extreme outer bun ends, which are located very near the element 44, are not burned by the element. For additional assurance that the bun outer ends will not be burned, the outermost holes (marked at 42a) in the bun heating chambers may be made smaller than the remainder of the holes 42.

Each outer portion 36 of the blank 32 contains a further set of holes 50. The holes 50, which permit heat from the element to reach a frankfurter located in the guide structures 16a, 16b, are smaller and less numerous at the outer edges of portions 36 than at the inner edges. As shown in FIG. 3, this partly shields the portion of the frankfurter closest to the element 44 and prevents it from blistering unduly. At the portions of the guide structures 16a, 16b located farthest from the element 44, marked at 51 in FIG. 3, the holes 50 are larger and more numerous and permit more heat to reach the frankfurters (so that the rear of the frankfurters will be adequately heated).

The shields 30 are normally at least partly reflective, and can be made highly reflective by polishing or by chrome plating. Since the heating chamber 14 is circular in outline, radiation from the element 44 is reflected from the inner surfaces of the walls 38 (except for that portion which passes through the holes 42) and is thus focussed on the frankfurters in guide structures 16a, 16b. This increases the heat applied to the frankfurters relative to that applied to the buns, and helps to ensure that heating of both is completed at the same time. It is estimated that typically, with a stainless steel reflecting surface not having a glossy surface, about half the heat supplied to the frankfurter is delivered by convection, and about half is delivered by radiation.

Figures 6, 7:
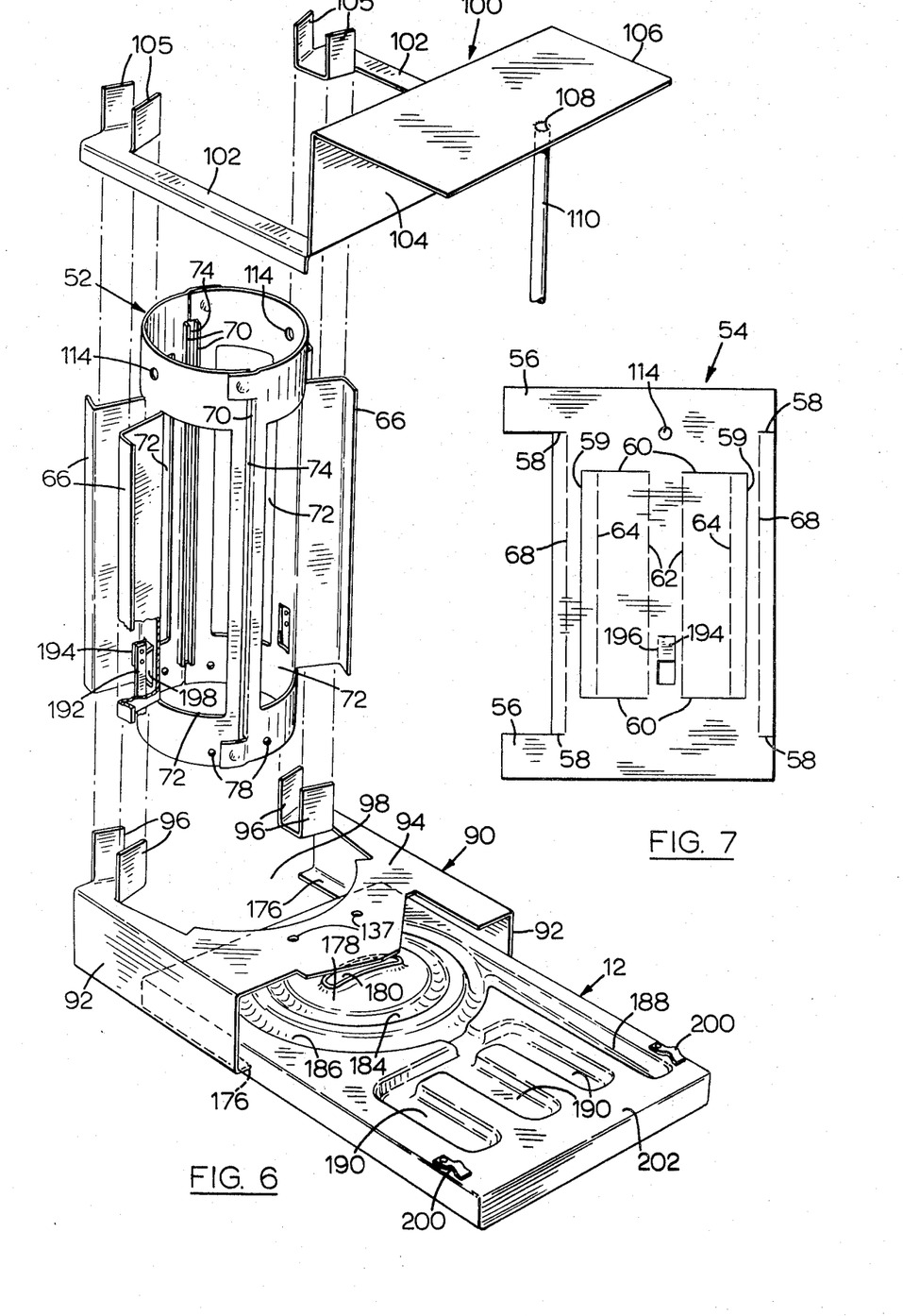
FIG. 6 is an exploded view of frame members and a grease drawer of the FIG. 1 toaster.
FIG. 7 is a plan view of a blank used to form a portion of a frame shown in FIG. 6.

The manner in which the shields 30 are supported will next be explained, with reference to FIGS. 6 and 7. As there shown, the support means consists of an open frame 52 formed from two flat sheet metal members 54, one of which is shown in FIG. 7. Each member 54 is generally rectangular in form, but with a pair of upper and lower projecting end tabs 56. Cuts are formed in the sheet metal member 54 at lines 58, 59, 60. The metal is then folded out along lines 62, 64 to form a pair of L-shaped wings 66 (FIG. 6), and along lines 68 to form inwardly projecting flanges 70. The two sheet metal members are each then bent in a semicircular shape and joined at their end tabs 56 (e.g., by welding) to form the frame 52. The frame 52 includes windows 72, formed by the folding out of the wings 66, and also includes opposed vertically oriented slots 74 formed by spacing apart the adjacent ends of the two sheet metal members 54. The slots 74 accommodate the lift bar of the elevator 19, as will be described.

The frame 52 supports the shields 30 in the following manner. Each shield 30 is of radius slightly greater than the frame 52, and since the shields 30 are of somewhat flexible sheet metal, they are simply squeezed slightly and then slid up into the frame 52. The inwardly projecting flanges 70 of the frame serve to position the shields 30 in the frame (see FIG. 3) to ensure that the slots 74 are not blocked by the shields. Although friction between the shield members 30 and the frame 32 is normally sufficient to hold the shields in position, an additional retainer is provided in the from of a pair of outwardly projecting dimples 76 at the bottom of the shields 30, which dimples are received in holes 78 in the frame 52. To facilitate removal of the shields 30 for cleaning, they are equipped at their bottoms with opposed legs 80 (formed from tabs 82 on the blanks 32), so that a shield can be removed by grasping its legs 80, squeezing them together, and withdrawing the shield from the bottom of the frame 52. One shield 30 is shown being so withdrawn in FIG. 9.

It will be seen that the fronts of the bun heating chambers 18a, 18b are formed by the shields 30, and that as previously indicated, heat from the element 44 passes through the holes 42 in the shields 30 and through the windows 72 in the frame 52 to reach the buns. The rear parts of the bun heating chambers 18a, 18b are formed by elongated sheet metal holders 84 which are shown in top view in FIG. 3 and in perspective in FIG. 8. Each holder 84 has an arcuate main wall 86 having at its ends a pair of inwardly projecting flanges 88 which are received within the L-shaped wings 66 of the frame 52 (FIGS. 3 and 6). The holders 84, which are secured to the wings 66 by any desired means, e.g., welding, extend from the top to the bottom of the frame 52 and include a slot 89 for the elevator 19.

The frame 52 is mounted (FIG. 6) on a sheet metal base 90. The base 90 has a pair of upright side walls 92 joined by a top wall 94. The top wall 94 has at one end thereof two pairs of opposed upwardly projecting tabs 96. The tabs 96 extend upwardly between the wings 66 of the frame 52 (as shown in dotted lines in FIG. 3) and are secured to the wings 66 by welding or riveting. The top wall 94 of the base 90 also includes an enlarged generally semi-circular opening 98, shaped to accommodate one-half of the frankfurter heating chamber 14 and one bun heating chamber 18b. The frame 52 is secured to the base 90 with the lower edge of the frame located just below the top wall 94 of the base, and with the bottom of the frankfurter heating chamber 14 and the bun heating chambers 18a, 18b all open, for good convection.

A top frame member 100 (FIG. 6) is also provided, having a pair of horizontal arms 102 joined by a vertical plate 104. Each arm 102 carries at its end a pair of upright tabs 105 which are secured (by welding or riveting) to the inner surfaces of the wings 66 (in the same manner as the lower tabs 96) to support the top frame member 100 with the top of plate 104 flush with the top of the frame 52. From the top of plate 104, a horizontal plate 106 projects forwardly and has at its end a hole 108 for a post 110 which guides the elevator, as will be described.

Figure 9:
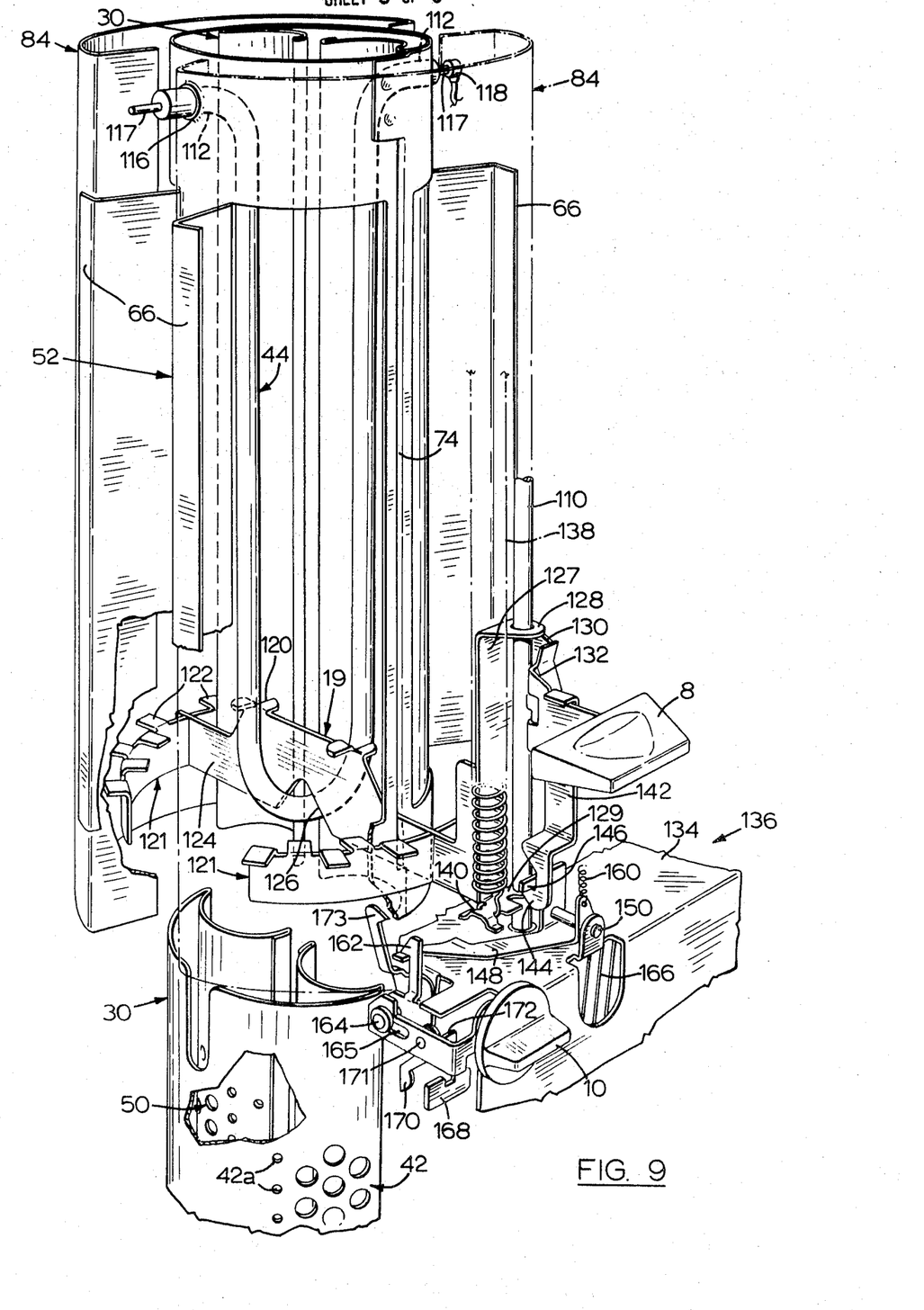
FIG. 9 is a perspective view, partly cut away, showing the heating chambers, timing and control mechanism, and the elevator of the FIG. 1 toaster.

The element 44, shown in FIG. 3 and also in FIG. 9, is a standard U-shaped sheathed element having a cross-over 111 at the bottom of the frankfurter heating chamber 14. Such heaters are provided as a standard item by Chromalox Canadian Company Limited of Rexdale, Ontario, Canada. In one device according to the invention a 650 watt heater was used and gave excellent results, cooking two frankfurters and toasting two buns in three to four minutes. It is found that using a higher wattage element does not reduce the cooking time, because the frankfurter conducts heat to its centre only at a limited rate, and application of too much heat simply blisters and ruptures the exterior, without decreasing the time required to cook the interior of the frankfurter. However, if the shields 30 are made highly reflective, then since more radiation is applied to the frankfurter, the element 44 can be made slightly less powerful.

As shown in FIGS. 3 and 9, the top portions 112 of the element 44 are bent outwardly and extend through opposed slots 113 (see also FIGS. 4, 5) in the tops of the shields 30 and through opposed apertures 114 (FIG. 6) in the top of the frame 52. Conventional fastening means, indicated at 116 in FIG. 9, are used to secure the element 44 in place. Electrical connections diagrammatically indicated at 118 are then made to the exposed conductors 117.

Since the element 44 is located in a plane which bisects the frankfurter heating chamber 14 and is oriented at right angles to a plane joining the axes of the frankfurter guide structures 16a, 16b, and since the bun heating chambers 18a, 18b are symmetrically located behind the frankfurter guide structures, uniform heating of both frankfurters, and uniform heating of both buns by the single element is achieved. At the same time the element 44 does not interfere with removal of the shields 30 because its upright portions and its cross-over 111 are located in the space, indicated at 119 (FIG. 3), between the two frankfurter guide structures 16a, 16b.

It is found that, with the element cross-over 111 located at the bottom of the heating chamber 14, convection currents moving upwardly ensure a relatively uniform heat distribution in the frankfurter heating chamber 14, assisting in cooking the frankfurters uniformly. At the same time the electrical connections 118 are placed at the top of the device and outside the heating chamber 14, thus completely eliminating the danger of any grease dripping onto the connections. The connections 118 are cooled by air rising between the L-shaped wings 66. Since the connections 118 are located in the spaces between the ends of the bun heating chambers 18a, 18b, optimum compactness is achieved.

It will be seen that the backstop 24 (FIGS. 1, 2) provides a cover for the entire frankfurter heating chamber 14 except for the frankfurter guide structures 16a, 16b. The cover, by confining some heat and moisture within the chamber 14, permits cooking with a lower wattage element and improves the quality of the cooked frankfurters. The cover 13, which is clipped to the top frame 100 by means not shown, protects the electrical connections 118 and provides a finished appearance for the toaster.

Figures 8, 10:
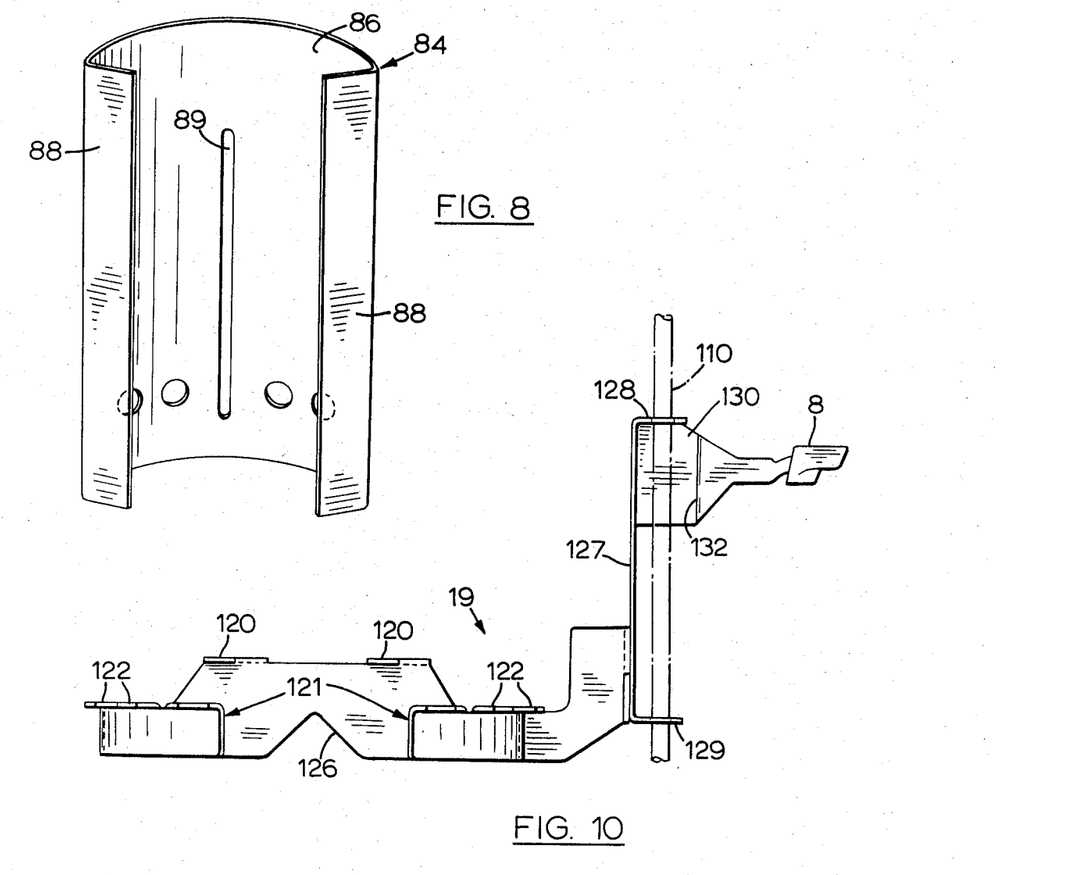
FIG. 8 is a perspective view of a bun cover for the FIG. 1 toaster.
FIG. 10 is a side elevation showing the elevator of the FIG. 1 toaster.

The elevator 19 for the frankfurters and buns, best shown in FIGS. 3, 9 and 10, is a single member having support portions 120 for the frankfurters and support portions 121 for the buns. It will be noted that the frankfurter support portions 120 are at a higher elevation than the bun support portions 121; this is because frankfurters are usually shorter than buns, and the arrangement shown roughly centers the frankfurter in its bun and also ensures that the frankfurter will project sufficiently above the top of the toaster that the projecting portion can be gripped by the bun. The bun support portions 121 of the elevator 19 are arcuate in plan, with tabs 122 bent therefrom, so that they can support each bun in a partly opened configuration.

The bun and frankfurter support portions 120, 121 are all joined by a central lift bar 124 which passes through the slots 74 (FIG. 6) in the frame 52 and through the spaces 125 (FIG. 3) located between opposing halves of the frankfurter guide structures 16a, 16b. A notch 126 in the lift bar, between frankfurter support portions 120, accommodates the element cross-over 111. One end of the lift bar 124 is secured (FIG. 10) to a vertical bracket 127 having a pair of outturned ends 128, 129. The ends 128, 129 have aligned holes therein to accommodate the guide post 110 of the lift mechanism, so that the elevator 19 is cantilevered from the post 110 and guided by the slots 74. At one side of the bracket 127, a metal flange 130 projects forwardly, to one side of the post 110, the flange 130 then being bent in an L-shape as shown at 132 (FIG. 9) to carry the lift knob 8.

The guide post 110 for the elevator is anchored at its top plate 108 (FIG. 6) as previously described, while the bottom of post 110 is anchored to the cover 134 (FIG. 9) of a timer and control mechanism 136 now to be described.

The timer and control mechanism used for the toaster of the invention is typically a standard Toastmaster timer and cOntrol model No. B171. Since this timer and control is widely used and is commercially available, and is well known to those skilled in the art, only a brief description of its construction and operation will be given, with reference to FIG. 9. It will be appreciated that the timer and control mechanism shown in FIG. 9 is secured to the top wall 94 (FIG. 6) of the base 90 by screws (not shown) through holes 137 in the top wall 94.

As shown in FIG. 9, the timer and control mechanism 136 includes a coil spring 138 attached to the bracket 127 by a tab 140. The spring 138 extends up to and is secured to the top plate 106 (FIG. 6) by means not shown, so that the spring 138 biases the knob 8 and elevator 19 to raised position, as is conventional.

As also shown in FIG. 9, a latch 142 is pivoted on flange 130 by a hinge (not shown). The latch 142 extends downwardly to terminate in a hook 144. The hook 144 is shown latched in its down position by the hooked end 146 of a lever 148. The lever 148 pivots on a shaft 150 and is biased to rotate clockwise as drawn by a spring 160.

The lever 148 is held in the position drawn by a latch 162. The latch 162 is pivoted about a shaft 164 mounted in a slotted hole 165 and is biased to the position drawn by a torsion spring (not shown) on its shaft.

Beneath the cover 134 is a small heater element 166 which is wound around a bimetal strip, the end of which is shown at 168. When the knob 8 is pushed down, it closes (by means not shown) a limit switch (not shown) which energizes the heater element 166, causing the bimetal strip to heat. This causes the end 168 of the bimetel strip to move to the left as drawn. When the end 168 of the bimetal strip moves to the left, it engages and rotates clockwise a spoon-shaped actuator 170. Actuator 170 is pivoted at 171 to the cover 134 and has at its end a tab 172 which engages a portion (not shown) of latch 162, moving latch 162 out of engagement with the lever 148.

A second latch 173 is also provided for the lever 148. The latch 173 is normally held in the disengaged position shown by the actuator 170 (by means of a connector not shown). When end 168 moves to the left, latch 173. which is spring-loaded, moves into position over the end of the lever 148 to retain the lever in position. There is an overlap between the two latches 162, 173 so that before latch 162 moves away from the lever 148, latch 173 moves into position over the lever. However, latch 173 is positioned one-eighth inch higher than latch 162, so that when latch 162 disengages and latch 173 engages the lever, the lever 148 is allowed to move up one-eighth inch. This triggers another limit switch, not shown, which turns off the element 166, causing the bimetal strip to cool down and causing its end 168 to move back to the right. This restores the latches 162, 173 to the positions shown, except that since the tip of the lever 148 is now one-eighth inch higher than the latching portion of the latch 162, the latch 162 does not engage and as soon as latch 173 moves out of engagement with the lever, the mechanism is allowed to pop-up.

The timing is adjusted by a spiral groove (not shown) in the rear surface of the time adjustment knob 10, so that when the knob 10 is turned, the actuator 170 is rotated, varying the time when it causes latch 162 to disengage from the lever 148.

The lift mechanism also includes conventional means, not shown and forming part of the Toastmaster timer and control mechanism previously identified, which allows a user to over-ride the timing mechanism by pushing the knob 8 upwardly. Spring 138 then pops-up the elevator to its raised positon.

The grease drawer 12 for the toaster will next be described, with reference to FIGS. 6 and 11. As shown, the drawer 12 is rectangular in plan and slides into and out of the base 90, guided by inturned flanges 176 at the bottoms of the side walls 92 of the base. The drawer 12 contains a central domed well 178 having in its centre a slot 180 to allow air to flow beneath the drawer and up through the heating chambers 14, 18a, 18b. The drawer 12 can be slid into the base to a position in which the slot 180 is directly beneath the element 44. In this position no grease will drip through the slot 180 (any grease on the element will burn off), and air drawn beneath the drawer and up through the slot 180 will help to keep the drawer and any grease in it cool.

Since the central well 178 is dome-shaped, being higher at its middle and lower at its edges (FIGS. 6, 11), therefore dripping grease will be directed toward its edges and away from the element 44. Grease is additionally directed away from the centre of drawer 12 by providing sloping inner corners 182 (FIGS. 4 and 5) for the shields 30. The sloping inner corners 182 also help prevent the metal of the shields 30 located near the element cross-over 111 from becoming too hot.

A pair of circular channels 184, 186 are provided around the edge of the domed well 178, to receive grease from the well 178. Two channels 184, 186 are provided instead of one to reduce the likelihood of grease spilling if the toaster is tilted.

Grease from the channels 184, 186 is directed to the front of the drawer 12 via a channel 188. The channel 188 becomes progressively deeper towards the front of the drawer, and it conducts grease to a position in which the user can immediately see it once the drawer is open. Auxiliary channels 190 at a slightly higher level than channel 188 serve as a reservoir for storing additional grease in a position away from the element 44 after the channel 188 becomes partly filled.

Special means are provided to warn a user that the tray must be cleaned. As indicated in FIGS. 3, 6 and 11, these means comprise a pair of bimetal strips 192, one at each side of the drawer. Each bimetal strip 192 is hooked over the back of the drawer 12 and extends upwardly to a position between the L-shaped wings 66 of the frame 52. There each bimetal strip 192 is secured to a tab 194 bent out on line 196 (FIG. 7) from the sheet metal of the frame. The bimetal strips 192 are exposed to heat from the element 44 via a window 198 in the metal of the frame 52 between the wings 66.

Figure 11:
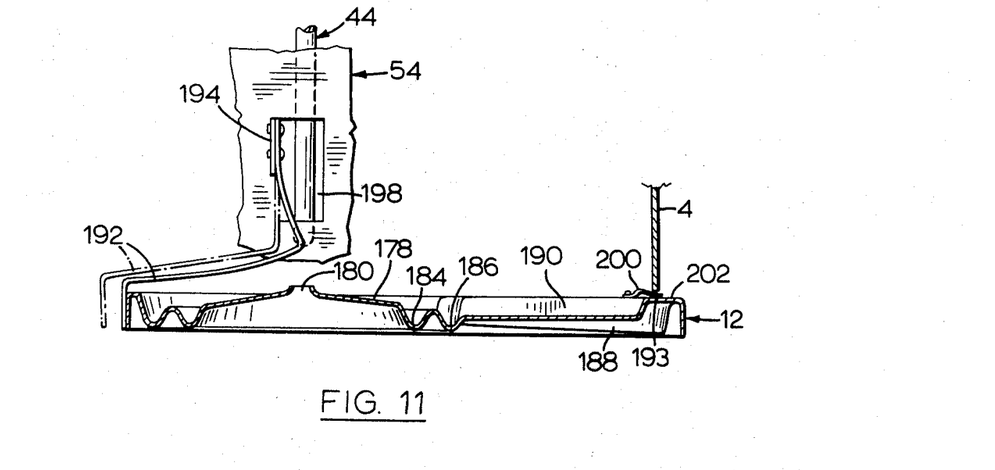
FIG. 11 is a sectional view of the grease drawer of FIG. 6, and also showing a pop-out mechanism for the drawer.

When the element 44 is energized, the bimetal strips 192 heat and bend from the position shown in dotted lines in FIG. 11 to the position shown in solid lines, propelling the drawer 12 forward slightly until spring stops 200 on the drawer encounter the forward downwardly projecting edge 192 of the toaster cover 4. When the tray is thus moved slightly outwardly, a strip 202 at the top surface of the front of the tray becomes visible to the user. In addition, the front portion of the channel 188 becomes visible. The strip 202 will typically contain a warning in red letters such as "Clean Tray When Grease Becomes Visible," thus alerting the user to the fact that the drawer must be removed and cleaned periodically. The tray can be removed simply by pulling it outwardly, flattening the spring stops 202. When the arrangement shown in FIG. 11 is used, the slot 180 in the drawer will be arranged to be positioned immediately below the element 44 when the drawer is in the position shown in FIG. 11, i.e., slightly popped-out. When the drawer is pushed to its rearmost position (i.e., to the dotted line position of the bimetal strips 192), it is stopped by the rear part (not shown) of the cover 4 of the toaster. If desired a light spring stop (which the bimetal strips 192 can overcome) can be used to prevent the drawer 12 from sliding out from its fully inserted position when the element 44 is not energized.

It will be apparent that the drawer 12 must be removed from the toaster before the shields 30 can be withdrawn for cleaning. It will also be realized that other linkages can be used to cause the drawer 12 to pop-out slightly when the toaster is energized. Alternatively, the front of the drawer can be made transparent, so that grease in the channels will be visible to a user.

Although the heating chambers 18a, 18b for the buns have been shown as arcuate, it will be appreciated that they could be of different form, e.g., V-shaped, or elliptical, or parabolic. In all cases, however, each bun heating chamber must be shaped so that the bun need be opened only party way in order to place it in its heating chamber, but at the same time it must be open sufficiently so that its inner faces become toasted. In other words, each bun heating chamber will always have two diverging portions, one for each half of the frankfurter bun.

The bun heating chambers 18a, 18b may be shaped to hold the bun open at an angle in the range between approximately 50° and 140°. The angle referred to, indicated at X in FIG. 3, is the angle between the opposing inner faces of the frankfurter bun when located in its bun heating chamber. Preferably angle X lies between 75° and 110°, and in a typical preferred embodiment of the invention, the angle X was approximately 90°.

If desired, buns can be toasted separately in a separate bun toaster equipped only with the angled or curved slots described for the buns, and without the frankfurter guide structures 16a, 16b. (In this event the bun heating chambers can be moved closer together; shields 30 need not be removable, and a less powerful element can be used, or a conventional toaster element can be used for each bun heating chamber.) However, when buns and frankfurters are toasted together so that the bun can be used to grip the frankfurter, it is preferred that the bun and frankfurter heating chambers be oriented so that a line drawn between the ends of the bun heating chamber will intersect its associated frankfurter guide structure, i.e., the guide structure is located at least partly between the arms of its bun heating chamber. Preferably the frankfurter guide structure will be as fully between the arms of the bun as possible.

Although the holes 42, 50 in the shields 30 (FIGS. 4, 5) are shown as round, any other hole shape (e.g., slotted) can be used so long as the shields perform their basic function of blocking excess radiation from reaching the buns. The shields 30 need not be removable but can be fixed structures; however the removability of the shields is a considerable convenience since they are likely to become grease splattered and dirty in use, and removal for cleaning will maintain their reflectivity and hence the efficiency of the device, as well as preventing unsanitary conditions.

I claim:

1. A toaster for heating a frankfurter bun of the type having two connected halves, said toaster comprising:
   a. a heating chamber for said bun, said heating chamber having first and second connected diverging portions for restraining said bun in a V-shaped configuration,
   b. an elevator in said chamber for raising and lowering said bun, said elevator including first and second connected diverging elevator portions for supporting the bottoms of the two halves of said bun,
   c. means for raising and lowering said elevator,
   d. and element means associated with said heating chamber for toasting said bun.

2. A toaster according to claim 1 wherein said heating chamber and elevator are both curved in plan.

3. A toaster according to claim 2 wherein said curvature is circular.

4. A toaster according to claim 3 wherein said portions of said bun heating chamber diverge at an angle such that the faces of the two halves of said bun diverge at an angle of between 50° and 140°.

5. A toaster according to claim 4 wherein said angle is approximately 90°.

6. A toaster for heating both a frankfurter bun of the type having two connected halves, and a frankfurter, said toaster comprising:
   a. a heating chamber for said bun, said heating chamber having first and second connected diverging portions for restraining said bun in a V-shaped configuration,
   b. an elevator in said chamber for raising and lowering said bun,
   c. means for raising and lowering said elevator,
   d. element means associated with said heating chamber for toasting said bun,
   e. substantially cylindrical frankfurter guide means for constraining said frankfurter for movement along its axis in a direction parallel to the direction of movement of said bun,
   f. said frankfurter guide menas being located at least in part between said diverging portions of said bun heating chamber,
   g. said elevator having a portion extending into said frankfurter guide means so that movement of said elevator raises and lowers said frankfurter and bun simultaneously, whereby when said frankfurter and bun are raised to project from said toaster, said frankfurter can be gripped with said bun and thereby lifted from said toaster.

7. A toaster according to claim 6 wherein said element is a single electrical element for heating both said bun and said frankfurter.

8. A toaster according to claim 7 and including a plurality of said frankfurter guide means and a plurality of said bun heating chambers, each frankfurter guide means being associated with one bun heating chamber and being located at least in part between the arms of its associated bun heating chamber.

9. A toaster for heating both a frankfurter bun of the type having two connected halves, and a frankfurter, said toaster comprising:
   a. a heating chamber for said bun, said heating chamber having first and second connected diverging portions for restraining said bun in a V-shaped configuration for movement in a direction parallel to the longitudinal axis of said bun,
   b. frankfurter guide means for constraining said frankfurter for axial movement in a direction parallel to said first mentioned direction,
   c. said frankfurter guide means being located to position said frankfurter at least in part between said diverging portions of said bun heating chamber,
   d. element means for heating said frankfurter and said bun,
   e. and elevator means operative for moving said bun and said frankfurter simultaneously in said heating chamber and said frankfurter guide means respectively, whereby when said elevator means is operated to move said bun and said frankfurter to positions in which they project from said toaster, said frankfurter can be gripped with said bun and thereby removed from said toaster.

* * * * *